Patented Jan. 15, 1935

1,988,300

UNITED STATES PATENT OFFICE 1,988,300

COMPOSITION FOR RETARDING SLUDGE FORMATION

Frank M. Clark, Pittsfield, Mass., assignor to General Electric Company, a corporation of New York No Drawing. Application July 9, 1932, Serial No. 621,756

4 Claims. (Cl. 252—1)

This application is a continuation-in-part of my prior application Serial No. 492,625 filed October 31, 1930.

The present invention relates to the suppression or retardation of sludge formation in mineral oil and particularly in oil or wax forming part of an electrical device as, for example, when employed as an insulating medium for the core and windings of an electrical transformer in regulators, bushings, or the like.

When insulating oils, and in particular hydrocarbon mineral oils, are subjected to the conditions of high temperatures and voltage which may exist in such devices, chemical and physical changes tend to occur in the oil which depreciate the insulating property of the oil and cause a sludge to form therein. Some of these changes are caused or promoted by the catalytic effect on the oil by metal parts of the electrical device, such effect being particularly marked when copper members are in contact with the oil. In electric transformers it is almost unavoidable to have copper in contact with the oil.

In accordance with my present invention sludge precipitation occurring in insulating oil is retarded and the insulation properties and fluidity of the oil are preserved by maintaining a solid organic compound of the cyclic series containing a nitro group in contact with or dissolved in the oil during its use in such electrical device. Examples of the type of compound which are capable of use in accordance with my invention are the following non-volatile, solid compounds; para nitrochlorbenzene, alpha nitronaphthalene, meta dinitrobenzene, hydroxy dinitrobenzene, ortho nitrophenol, para nitrophenol, para nitrobrombenzene, nitrochlorphenol, and dinitrophenol.

In carrying out my invention about $\frac{5}{10}$% by weight of a suitable nitro compound is dissolved in the oil or wax, of if a compound is employed which is but slightly soluble in the oil, a quantity of the compound is placed in contact with the oil at the bottom of the transformer, regulator, or similar device. I prefer to employ para nitrochlorbenzene in the amount of a fractional percent, ordinarily about one-half of one per cent by weight of the oil. In some cases more may be added. If desired additional amounts may be added at intervals.

The cyclic nitro compound may act to increase the solubility of the sludge in the oil, or as a negative catalyst or retarder of chemical changes, such as oxidation, which produces acidity or otherwise deteriorates the oil. These nitro compounds retard the sludge formation in oil when heated to an elevated temperature in the presence of copper. They prevent also a decrease in insulation characteristic and a rise of the power factor in oils when subjected to electric stresses over long periods of time.

What I claim as new and desire to secure by Letters Patent of the United States, is:

1. An insulating composition comprising a mineral hydrocarbon and a fractional percent of a solid cyclic nitro compound associated therewith.

2. The combination of an electric device containing a body of mineral oil and a quantity sufficient to effectively retard sludging of para nitrochlorbenzene.

3. A composition adapted for insulating and cooling purposes in electrical devices comprising mineral oil having associated therewith about $\frac{5}{10}$ per cent of nitrochlorbenzene.

4. A composition adapted for cooling and electrical insulating purposes consisting of mineral oil and a quantity of a reagent sufficient to effectively retard sludging of said oil, said reagent being a member of the class consisting of para nitrochlorbenzene, alpha nitronaphthalene, meta dinitrobenzene, hydroxy dinitrobenzene, ortho nitrophenol, para nitrophenol, para nitrobrombenzene, nitrochlorphenol, and dinitrophenol.

FRANK M. CLARK.